United States Patent [19]
Porter

[11] 3,872,528

[45] Mar. 25, 1975

[54] COMPOUND LEVERAGE TOOL

[75] Inventor: Thomas M. Porter, Concord, Mass.

[73] Assignee: H. K. Porter, Inc., Somerville, Mass.

[22] Filed: Nov. 7, 1973

[21] Appl. No.: 413,640

[52] U.S. Cl. .......................... 7/5.3, 30/124, 30/134
[51] Int. Cl. ............................................. B25b 7/22
[58] Field of Search ............ 30/134, 145, 194, 244,
30/245, 249, 250, 251, 252; 7/5.1, 5.3

[56] References Cited
UNITED STATES PATENTS

| | | | |
|---|---|---|---|
| 610,305 | 9/1898 | Day | 7/5.1 X |
| 785,230 | 3/1905 | Roberts | 30/145 |
| 877,220 | 1/1908 | Nilsson | 30/251 X |
| 1,862,033 | 6/1932 | Porter | 30/252 x |
| 2,632,246 | 3/1953 | Shoffner | 30/250 |

FOREIGN PATENTS OR APPLICATIONS 571,429  8/1945  United Kingdom .................. 30/134

*Primary Examiner*—Al Lawrence Smith
*Assistant Examiner*—J. C. Peters
*Attorney, Agent, or Firm*—Russell & Nields

[57] ABSTRACT

The disclosed compound leverage tool has an improved side shearing feature for shearing wire or wire rope. A pair of handles are pivotally connected at one of their ends to each other and to a pair of jaw members. The jaw members are in turn separately pivotally connected to a pair of side plates. A pair of straps extend outwardly from and along one side of the jaw members. These straps may be an integral part of the side plates or they may be separately mounted on the jaw members. The inner surface of one of the straps is formed with a groove which is intersected by the outer edge of one of the jaw members when the handles are closed, thereby forming a shearing operation. Any tendency of this shearing strap to spread away from the jaw member is inhibited by a fastener which limits the separation between the straps. The fastener which may be a nut and bolt is located near the shearing groove. The other strap may be formed with a surface which restrains one end of the wire rope while it is sheared.

11 Claims, 11 Drawing Figures

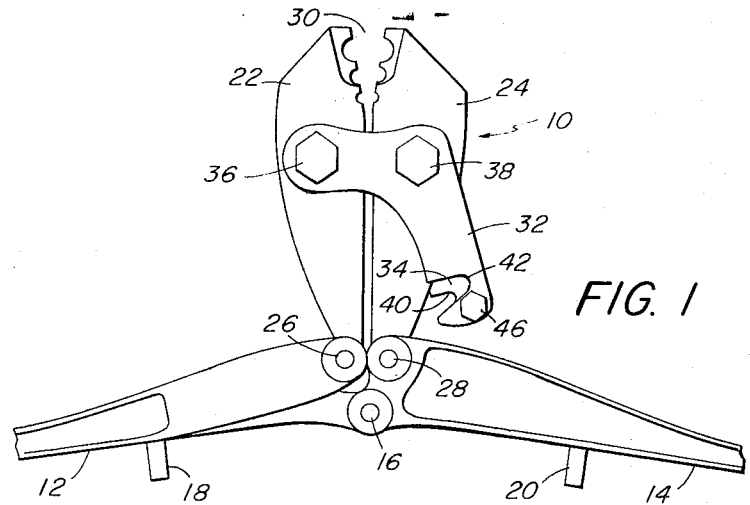
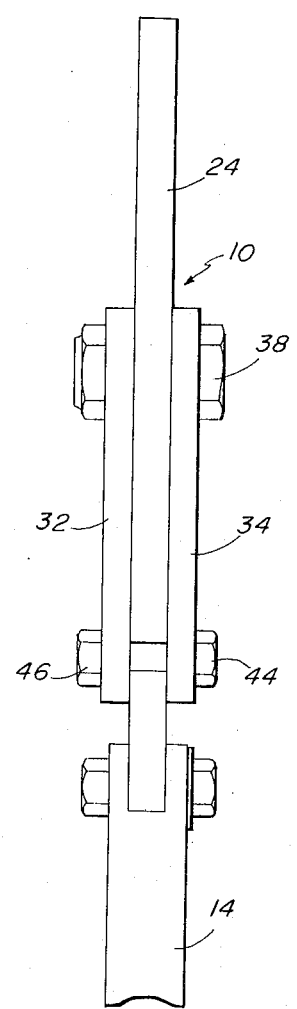
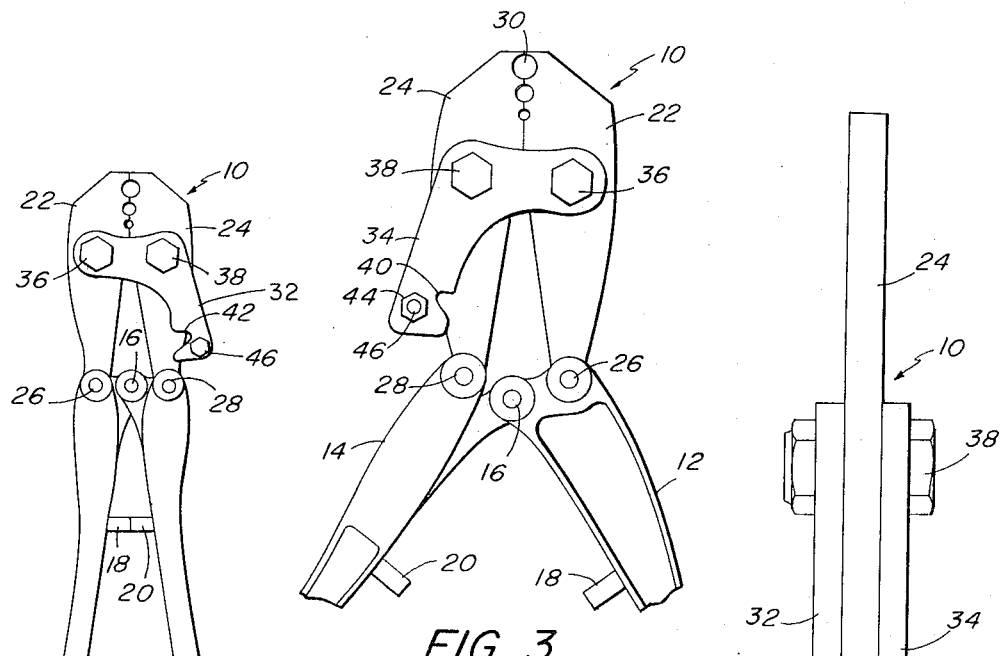
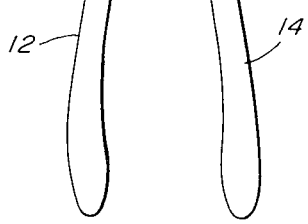
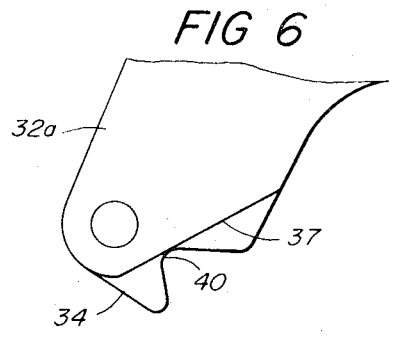

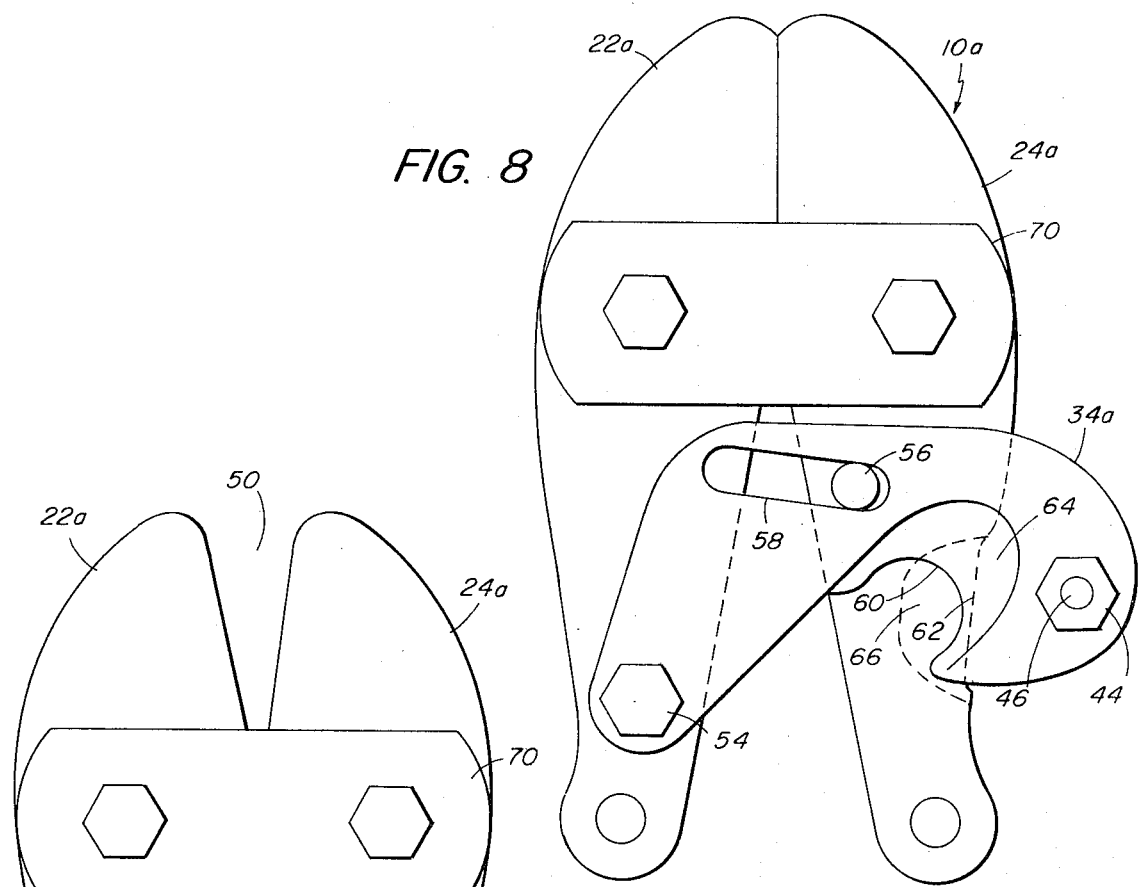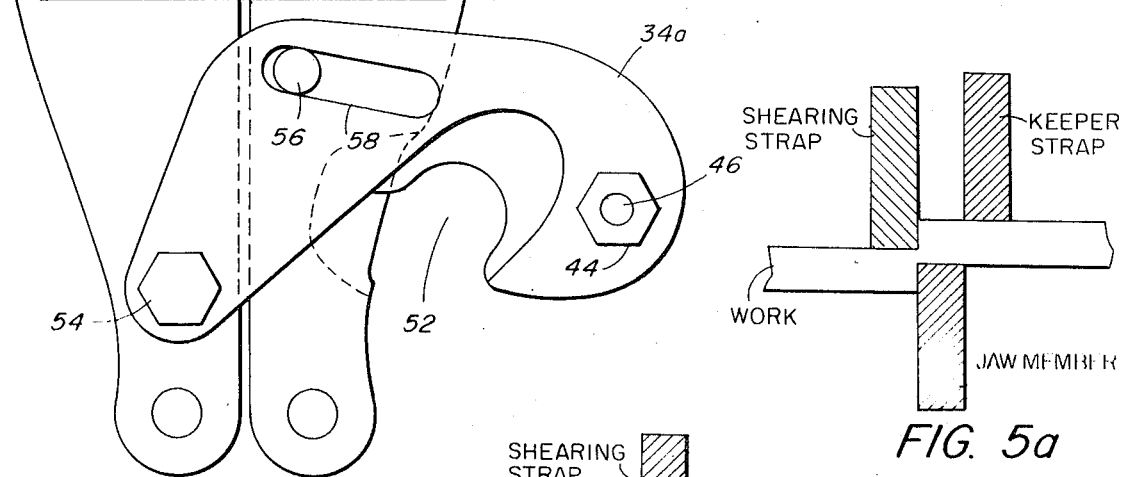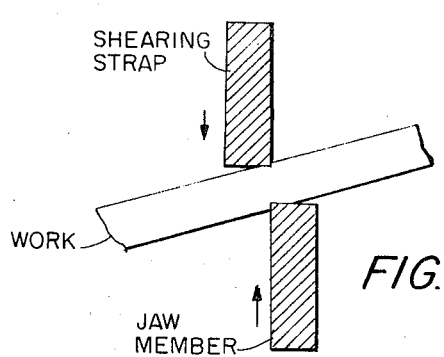

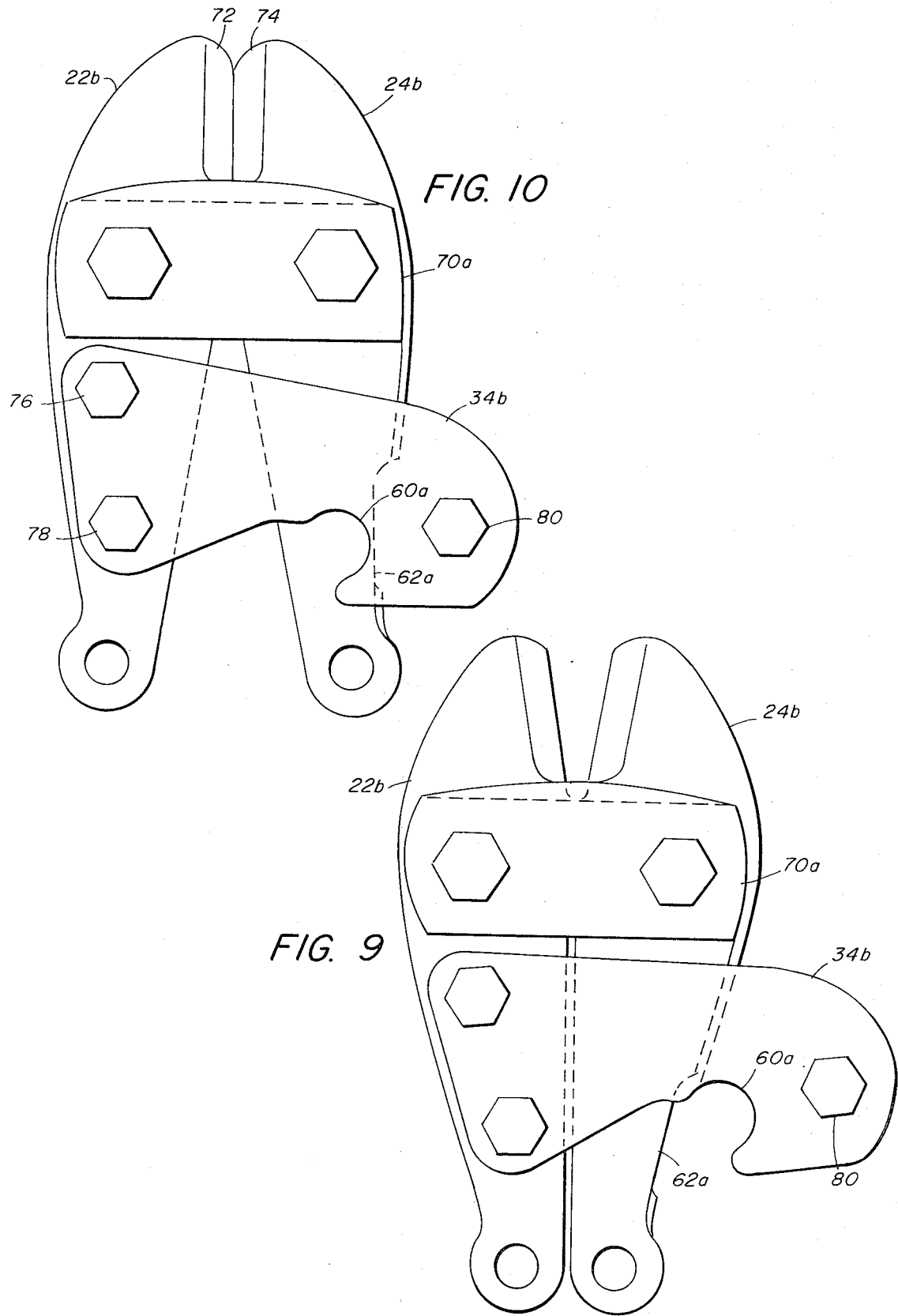

COMPOUND LEVERAGE TOOL

BACKGROUND OF THE INVENTION

The present invention relates to a compound leverage tool, and more particularly, to a compound leverage tool which has a side shearing action.

The term compound leverage tool as herein used is defined as a tool wherein the axis of rotation of the handles is different from the axis or axes of rotation of the jaw members. More specifically, in such a tool, the ends of the handles are pivotally connected to each other and also to the jaw members. The jaw members are then either pivotally connected to each other or separately pivotally connected to plates. In the latter case the jaw members rotate about separate axes, and the ends of the jaw members which perform the work of the tool close on each other but do not intersect each other. The jaw member of this tool cannot perform any shearing action and it is with this tool that the side shearing feature has been incorporated.

Such a tool may be described as a triple-axis tool, since each jaw member rotates about its own axis, while the handles are joined by and rotate about a third axis. Although each handle is connected to one of the jaw members by a pivotable coupling which constitutes an axis of rotation in principle, neither of these two pivotable couplings acts as a fulcrum, nor is such pivotable coupling a fixed axis.

One common use of the triple-axis compound leverage tool is in performing wire splicing operations. In this operation, the ends of the wires to be spliced together are located in a malleable metallic sleeve. The jaw members are formed with matching grooves. The sleeve is located in the grooves, and the tool compresses the sleeve around the wires so that they are securely joined. In many splicing operations, it is necessary for the user of the splicing tool to also shear the wire, such as when the operator is in mid-coil and has to make a wire junction. Typical examples of the need to shear as well as to splice wire include cables for garage doors, cables for the control wires in airplanes and wires for the construction of fences. Thus, a compound leverage tool capable of both splicing and shearing wire would be a useful tool.

Another use of the triple-axis compound leverage tool is in cutting heavy material such as steel bolts, guy strand and the like. Frequently, such as in the utility industry, such cutting operations are accompanied by a need to shear electrical cable. While small sizes of cable can be cut in the same manner as steel bolts, etc., the jaws do not open wide enough to receive the larger sizes of cable. Additionally, the jaws tend to mash the cable while cutting it, thus making the insertion of the end of the cable into a fitting or connector difficult. Thus, in such a cutting tool, it is desirable to have a shearing capability which cleanly shears all sizes of cable within the capacity of the tool.

U.S. Pat. No. 785,230 to Roberts discloses a compound leverage tool in which the jaw members perform a cutting operation and in which a side shearing operation is available. One of the straps to which the jaw members are pivotally connected extends outwardly from and along one of the jaw members. The inner edge of this extended strap and the side edge of one of the jaw members form a shearing operation when the handles of the tool are closed. However, no provision is made to prevent the spreading of the outermost end of the cutting edge of the strap away from the cutting edge of the jaw member in the manner hereinafter disclosed and claimed. I have found that such provision is extremely important, particularly when the tool is shearing flexible wire rope or the like as distinct from relatively stiff plate, as disclosed by Roberts.

SUMMARY OF THE INVENTION

According to the present invention, there is provided a triple-axis compound leverage tool which has a side shearing feature wherein the problem of spreading is inhibited. More particularly, the side shearing feature is accomplished by a pair of straps extending outwardly from and along the side edge of one of the jaw members and a fastener preventing spreading of the straps which is located near the shearing region and yet which does not interfere with the shearing operation. The straps are pivotally connected to the jaw members. The primary advantage of this arrangement is that spreading of the shearing strap due to the bending of the strap near the shearing region is inhibited. This is accomplished by holding the strap in a fixed position with respect to the jaw member close to the shearing region.

Such a tool may be described as a composite tool comprising in combination a first jaw member having a pressure portion and a control portion separated by a pivot point, a second jaw member having a pressure portion and a control portion separated by a pivot point, means for rigidly connecting said pivot points to each other while permitting rotation of each jaw member about its respective pivot point, the adjacent edges of said jaw members being arcuate or bent to permit such rotation between a pressure position in which pressure portions of said adjacent edges exert pressure against a work piece and a relaxed position in which said pressure portions are separated from one another, handle means connected to the control portions of said jaw members and adapted to move said jaw members from said relaxed position to said pressure position by moving said control portions away from each other, a portion of the outer edge of said first jaw member having a first shearing edge, a shear member affixed (permissibly including pivotal affixation) to said second jaw member and connected to said first jaw member by guide means which permits relative movement between said shear member and said first jaw member, said shear member having a second shearing edge adapted to coact with said first shearing edge in a shearing motion as said control portions are moved away from each other, a shear support member affixed to said shear member so as to flank said jaw members, the connections between said shear member and said shear support member being close to and flanking said shearing edges.

The essential feature is that the shear member is affixed to the second jaw member by at least a pivotal affixation, so that the position of the shear member is determined by that of the second jaw member. There must also be a relationship between the shear member and the first jaw member such that when motion is imparted to the first jaw member, that motion is one which involves relative motion between the shear member and the (first) shearing edge of the first jaw member. Since the relationship between the shear member and the first jaw member thus must permit relative motion therebetween, I refer to the means for establishing this relationship as "guide means". Such guide means may comprise a post on the first jaw member coacting with a slot in the shear member, thus permitting relative translational movement; or such guide means may comprise a pivotal connection between the first jaw member and the shear member, thus permitting only relative rotational movement. Indeed, in one embodiment of the invention such guide means comprises simply the fact that the shear member and the shear support member flank said first jaw member so as to receive some support therefrom against lateral movement.

In one embodiment of the invention, the shear member is affixed to said pivot points and said guide means thus permits only relative rotational movement between said shear member and said first jaw member.

In another embodiment the shear member is affixed to the control portion of said second jaw member and said guide means permits relative translational movement between said shear member and said first jaw member.

In still another embodiment, the shear member is rigidly affixed to the control portion of the second jaw member so that the guide means between the shear member and the first jaw member may be correspondingly relaxed and comprise simply the fact that the shear member and the shear support member flank said first jaw member so as to receive some support therefrom against lateral movement.

BRIEF DESCRIPTION OF THE DRAWINGS

In the drawings:

FIG. 1 is a view of a compound leverage tool for splicing and cutting wire with the handles fully open;

FIG. 2 is a view of the tool of FIG. 1 with the handles closed;

FIG. 3 is a view opposite to that shown in FIG. 2 of the tool with the handles partially closed;

FIG. 4 is a side view of the tool;

FIG. 5a is a diagram depicting the operation of the keeper strap;

FIG. 5b is a diagram depicting the motion of the work piece when a keeper is not used;

FIG. 6 is a view of an alternative form of keeper strap;

FIG. 7 is a partial view of an alternative form of compound leverage tool which cuts bolts and shears cable;

FIG. 8 is a view of the tool in FIG. 7 with operative members of the tool in a closed position;

FIG. 9 is a view of still another embodiment of a tool in an open position; and

FIG. 10 is a view of the tool in FIG. 9 with the cutting portions closed.

DESCRIPTION OF PREFERRED EMBODIMENTS

Referring now to the drawings, and particularly to FIG. 1, a compound leverage tool, represented generally by the reference numeral 10 is shown which is capable of splicing and shearing wire rope. A pair of operating handles 12 and 14 are pivotally hinged together at 16. The handles are brought from their fully extended orientation in FIG. 1 to their closed position as in FIG. 2. A pair of aligned posts 18 and 20 are formed on the inner surface of the handles. These posts contact each other when the handles are closed to limit the motion of the handles. Preferably, the handles are cast or forged metal.

The handles operate a pair of jaw members 22 and 24. The ends of the handles are pivotally connected to the ends of the jaw members at coupling points 26 and 28. The separation between these points of rotation 26 and 28 actually increases as the handles close. This movement of the points causes the other ends of the jaw members to close upon each other. The mating inner surfaces are formed with semi-circular grooves shown at 30. It is within these grooves that the wire rope is spliced. Splicing is accomplished by inserting the wire rope in a sleeve (not shown) and compressing the sleeve around the wire rope. There are two common types of sleeves; one in which the wires are placed side by side within the sleeve and one in which the wires are placed end to end within the sleeve.

In accordance with the present invention, a pair of straps 32 and 34 perform the combined functions of holding the orientation of the jaw members so that they may peform the splicing operation and of forming the basis of the shearing operation. The jaw members 22 and 24 are independently pivotally connected to the straps through a pair of fasteners 36 and 38, respectively. A triple-axis compound leverage tool, a tool in which each jaw member has a separate pivot axis, should be distinguished from one having a common pivot axis for the jaw members. In the latter type tool the jaw members may be directly used for shearing because the edges of the jaw members may overlap. However, in the triple-axis compound leverage tool of the present invention the edges of the jaw members contact each other but do not overlap. Thus, since the jaw members alone do not shear, it is desirable to provide this tool with a shearing capability.

The shape of the straps 32 and 34 are important to the operation of the tool in the shearing mode, and for this reason the dimensions of the entire tool are generally drawn to scale. The shearing capability of the tool 10 is provided by the overlapping of the outer edge of the jaw member 24 with the edges of a groove 40 formed in the strap 34 when the handles of the tool are closed. FIG. 3, which is a view of the tool from the opposite side as the side shown in FIGS. 1 and 2, shows that the shearing is complete before the handles actually close. The strap does not move, but the control portion of the jaw member 24 moves toward the groove 40. Most of the rotation of the jaw members 22 and 24 is complete by the time the tool handles are in the position shown in FIG. 3. This is because the pivot points 26 and 28 undergo circular motion with the point 16 as the center of rotation. As the handles move from the FIG. 1 to the FIG. 3 orientations, the points 26 and 28 move such that a large component of this motion is perpendicular to the center line of the tool (a line between the jaw members). Then as the handles move from the FIG. 3 to the FIG. 2 orientation, there is very little displacement of the points 26 and 28. It should be noted that in FIG. 3 the jaw members 22 and 24 are closed. These members actually bend when the tool is fully closed as in FIG. 2. The jaw members thus are a heat treated steel alloy which has high strength and the ability to bend without suffering a permanent set.

In accordance with the present invention, the shearing strap 34 is inhibited from spreading away from the side edge of the jaw member by fastening it to the strap 32. A threaded bolt 46 is located in aligned openings in the straps 32 and 34 and a nut 44 is threaded onto the end of the bolt 46 which extends beyond the jaw member. The placement of the nut and bolt is important to the operation of the tool. First, it must not interfere with the shearing operation. Secondly, it should be as close to the grooves as possible to inhibit bending of the strap 34 in the immediate vicinity of the groove 40. Preferably, the fastener is on the outward side of the groove so that the strap 34 is inhibited from bending on both sides of the groove.

The strap (support member) 32 may also serve as a keeper to restrain the wire rope from moving while it is being sheared. This keeper, shown diagrammatically in FIGS. 5a and b, is an optional feature of the tool for cutting wire and wire rope shown in FIGS. 1 to 4. Since the cutting strap and the jaw member are offset from each other, they produce a moment on the work piece which results in the work piece cocking as in FIG. 5b. This cocking increases the tendency of the shearing edges to spread. The keeper strap, as shown in FIG. 5a, prevents or limits the cocking. In FIGS. 1 to 4 the keeper strap 32 has formed therein a groove 42 which is formed deeper into the strap than the groove 40. As shown in FIG. 2, the deepest portion of this groove 42 does not overlap the edge of the jaw member 24 when the handles are closed. It is not necessary that the strap 32 be formed with a groove. For instance, in FIG. 6 a keeper strap 32a is shown having a straight surface 37 which prevents twisting of the work piece while the strap 34 performs the shearing operation.

Referring now to FIGS. 7 and 8, an alternative form of compound leverage tool is depicted. This tool, represented by the reference numeral 10a, performs a cutting and a shearing operation. A pair of jaw members 22a and 24a are separately pivotally connected to a plate 70 and an identical plate (not shown) on the opposite side of the jaw members. The space between the jaw members at 50 forms the cutting region. A side shearing strap or shear member 34a is provided which forms a shearing region at 52. This strap 34a, together with a support strap or member (not shown) on the opposite side of the jaw members, is connected to the jaw member 22a by a fastener 54. The jaw member 24a is formed with an upstanding post 56 which is located in a slot 58 in the strap 34a. Thus, while being mounted on the jaw members, the shearing strap overlaps the side edge of the jaw members 24a when the handles (not shown) are closed. The nut 44 and bolt 46 inhibit spreading between the strap 34a and the jaw member 24a.

In FIG. 8, the shearing edge 60 of the shear member 34a and the shearing edge 62 of the jaw member 24a have sharp knife edges. To obtain these sharp edges, the shear member 34a and the jaw member 24a are beveled at 64 and 66 respectively. The beveled surface 66 is located on the side of the jaw member opposite that shown in FIG. 8. No keeper is necessary in the FIG. 8 and FIG. 9 embodiment because the sharp edges reduce the twisting movement on the work piece.

The tool shown in FIGS. 7 and 8 is designed for shearing large cable. When the handles are closed, the lower or control portion of the jaw members 22a and 24a separate. As the lower portion of the second jaw member 22a moves to the left, the shearing strap 34a also moves to the left since it is connected to the jaw member at the lower portion thereof. The lower portion of the jaw member 24a moves to the right. Thus, both the portions of the tool performing the shearing operation undergo translational motion. This occurs because the shearing strap is attached to the lower portion (or the control portion) of the jaw members. The post 56 on the jaw member 24a and the slot 58 in the shearing strap 34a act in combination as a guide for the shearing strap as it moves. Thus the embodiment of the invention in FIGS. 7 and 8 is adapted to shearing greater thicknesses than a comparably dimensioned tool of the type shown in FIGS. 1 to 4, wherein the shearing strap is attached to the jaw members at their respective pivot points, and therefore the shearing strap does not undergo any translational motion. The shear member 34a is free to rotate on fastener 54. There is a small rotational movement between shear member 34a and jaw member 22a.

FIGS. 9 and 10 show another embodiment in which the shear member is attached to the control portion of the second jaw member. As in the other embodiments, a first jaw member 24b and a second jaw member 22b are pivotably affixed at their pivot points to a plate 70a and to another plate (not shown) on the opposite side of the jaw members. The pressure portion of each jaw member 22b and 24b have bevelled cutting edges 72 and 74, respectively. A shear member 34b is rigidly attached to the control portion of the second jaw member 22b by a pair of fastening means 76 and 78. The shear member 34b is affixed to a support member (not shown) by fastening means 80.

In operation, a first shearing edge 62a on the first jaw member 24b and a second shearing edge 60a on the shear member 34b coact to form a shearing operation as the control portions of the jaw members are separated. If desired, the shearing edges may be bevelled as in the embodiment shown in FIG. 7 and FIG. 8. As in the FIG. 7 and FIG. 8 embodiment, the advantage of this embodiment in FIG. 9 and FIG. 10 resides in the ability to shear a larger-sized work piece. As in the embodiment of FIGS. 7 and 8, the magnitude of the relative motion between the two shearing edges is greater than in the FIG. 1 to FIG. 4 embodiment, and therefore the tool may be designed to have a larger initial shearing edge separation.

Preferably, the cutting edges of the jaw members and the straps are fully hardened to Rockwell C60, and the material is tool steel. These steels are first given a spring temper; then the cutting edges are locally hardened by induction hardening to C60. This last step involves heating and quenching.

Having thus described the principles of the invention, together with illustrative embodiments thereof, it is to be understood that, although specific terms are employed, they are used in a general and descriptive sense and not for purposes of limitation, the scope of the invention being set forth in the following claims.

I claim:
1. In a compound leverage tool of the type having a pair of handles pivotally connected to each other, a pair of jaw members each having a front side, a rear side, and a side edge pivotally connected to the handles and a pair of plates to which the jaw members are separately pivotally connected: an improvement (permitting such a tool to perform a shearing operation) including a pair of straps extending outwardly from and along a side edge of one of the jaw members, means for pivotally connecting the straps to the jaw members one to the front sides thereof and the other to the rear sides thereof to allow an inner surface of one strap to overlap the side edge when the handles are closed thereby per- forming a shearing operation, and means near the side edge for limiting the separation between the straps to inhibit the strap and the jaw member performing the shearing operation from spreading away from each other.

2. The tool according to claim 1 wherein the means for fixing the separation between the straps is a fastener including a bolt located in aligned apertures in the straps and a nut engaging the bolt.

3. The tool according to claim 2 wherein the section of the inner surface of the strap performing the shearing operation has formed therein a groove which overlaps the side edge of the adjacent jaw member whereby a material to be sheared is located therein.

4. The tool according to claim 1 further including means on the other of the straps for restraining the flexible wire rope or the like while it is sheared.

5. The tool according to claim 1 wherein said tool is adapted to splice two ends of a line such as wire, wire rope, and the like by compressing a metal sleeve around the ends of the line.

6. The tool according to claim 1 wherein said tool is adapted to cut heavy material and to shear copper cable and the like.

7. A composite tool comprising in combination:
a first jaw member having a front side, a rear side, an outer edge, and a pressure portion and a control portion separated by a pivot point, a second jaw member having a front side, a rear side, and a pressure portion and a control portion separated by a pivot point,
means for rigidly connecting said pivot points to each other while permitting rotation of each jaw member about its respective pivot point,
the adjacent edges of said jaw members being arcuate or bent to permit such rotation between a pressure position in which pressure portions of said adjacent edges exert pressure against one another and a relaxed position in which said pressure portions are separated from one another,
handle means connected to the control portions of said jaw members and adapted to move said jaw members from said relaxed position to said pressure position by moving said control portions away from each other,
a portion of the outer edge of said first jaw member having a first shearing edge,
a shear member affixed (permissibly including pivotal affixation) to the front side of said second jaw member and connected to the front side of said first jaw member by guide means which permit relative movement between said shear member and said first jaw member,
said shear member having a second shearing edge adapted to coact with said first shearing edge in a shearing motion as said control portions are moved away from each other,
a shear support member affixed (permissibly including pivotal affixation) to the rear side of said second jaw member and connected to the rear side of said first jaw member by guide means which permit relative movement between said shear support member and said first jaw member,
said shear support member also affixed to said shear member such that the connections between said shear member and said shear support member are close to and flanking said shearing edges.

8. A composite tool according to claim 7, wherein said shear member is affixed to said pivot points and wherein said guide means thus permits only relative rotational movement between said shear member and said first jaw member.

9. A composite tool according to claim 7, wherein said shear member is affixed to the control portion of said second jaw member and wherein said guide means permits relative translational movement between said shear member and said first jaw member.

10. A composite tool according to claim 9, wherein said shear member is rigidly affixed to said control portion of said second jaw member and wherein said guide means comprises simply the fact that said shear member and said shear support member flank said first jaw member so as to receive support therefrom against lateral movement.

11. A compound leverage tool according to claim 7 further including means on the support member for restraining a work piece during said shearing operation.

* * * * *